(12) United States Patent
     Maezawa

(10) Patent No.: US 11,967,302 B2
(45) Date of Patent: Apr. 23, 2024

(54) INFORMATION PROCESSING DEVICE FOR MUSICAL SCORE DATA

(71) Applicant: Yamaha Corporation, Shizuoka (JP)

(72) Inventor: Akira Maezawa, Shizuoka (JP)

(73) Assignee: YAMAHA CORPORATION, Shizuoka (JP)

( * ) Notice: Subject to any disclaimer, the term of this patent is extended or adjusted under 35 U.S.C. 154(b) by 611 days.

(21) Appl. No.: 17/158,709

(22) Filed: Jan. 26, 2021

(65) Prior Publication Data

US 2021/0151014 A1 May 20, 2021

Related U.S. Application Data

(63) Continuation of application No. PCT/JP2019/025871, filed on Jun. 28, 2019.

(30) Foreign Application Priority Data

Aug. 10, 2018 (JP) .................. 2018-151320

(51) Int. Cl.
*G10G 3/04* (2006.01)
*G06N 5/04* (2023.01)
*G06N 20/00* (2019.01)
*G10H 1/00* (2006.01)

(52) U.S. Cl.
CPC ............... *G10G 3/04* (2013.01); *G06N 5/04* (2013.01); *G06N 20/00* (2019.01); *G10H 1/0025* (2013.01); *G10H 2210/105* (2013.01)

(58) Field of Classification Search
CPC ............ G10G 3/04; G06N 20/00; G06N 5/04; G10H 1/0025; G10H 2210/105
See application file for complete search history.

(56) References Cited

U.S. PATENT DOCUMENTS

| 2011/0000360 A1* | 1/2011 | Saino | G10L 13/10 84/622 |
| 2014/0180683 A1* | 6/2014 | Lupini | G10H 1/366 704/208 |
| 2019/0087734 A1* | 3/2019 | Ide | G06V 40/20 |

FOREIGN PATENT DOCUMENTS

| JP | 2000200086 A | 7/2000 |
| JP | 2011164162 A | 8/2011 |
| WO | 2017168870 A1 | 10/2017 |

OTHER PUBLICATIONS

Office Action in the corresponding Japanese Patent Application No. 2020-536379, dated Jan. 11, 2022.
Junyoung Chung et al., "A Recurrent Latent Variable Model for Sequential Data", available online on 2016.4.6 at https://arxiv.org/pdf/1506.02216.pdf.
International Search Report in PCT/JP2019/025871, dated Sep. 17, 2019.

(Continued)

*Primary Examiner* — Jianchun Qin
(74) *Attorney, Agent, or Firm* — Global IP Counselors, LLP

(57) ABSTRACT

An information processing method includes generating performance data that represent a performance of a musical piece that reflects a change caused by a factor that alters the performance of the musical piece, by inputting musical score data, which represent a musical score of the musical piece, and variability data, which represent the factor, into a trained model.

17 Claims, 13 Drawing Sheets

(56) References Cited

OTHER PUBLICATIONS

Kim, T. H., et al., Polyhymnia: An automatic piano performance system with statistical modeling of polyphonic expression and musical symbol interpretation, Proc. International Conference on New Interfaces for Musical Expression, May 2011, pp. 96-99.
Flossmann, s., et al., Expressive performance rendering: introducing performance context, Proc. Sound and Music Computing Conference, Jun. 2009.
Notice of First Examination Opinion in the corresponding Chinese Patent Application No. 201980051783.7, dated Jul. 21, 2023.

* cited by examiner

INFORMATION PROCESSING DEVICE FOR MUSICAL SCORE DATA

CROSS-REFERENCE TO RELATED APPLICATIONS

This application is a continuation application of International Application No. PCT/JP2019/025871, filed on Jun. 28, 2019, which claims priority to Japanese Patent Application No. 2018-151320 filed in Japan on Aug. 10, 2018. The entire disclosures of International Application No. PCT/JP2019/025871 and Japanese Patent Application No. 2018-151320 are hereby incorporated herein by reference.

BACKGROUND

Technological Field

The present invention relates to technology for processing musical score data representing the musical score of a musical piece.

Background Information

Various technologies for generating performance data, which represent a performance to which a musical expression (hereinafter referred to as "musical expression") has been added from musical score data that represent the musical score of a musical piece, have been proposed in the prior art. For example, Non-Patent Document "Gerhard Widmer, Sebastian Flossmann, and Maarten Grachten, "YQX Plays Chopin," AI Magazine, Vol 30, No 3, p. 35-48, 2009" discloses a technology that uses a Bayesian model, which reflects the tendency of a performance by a specific performer, to generate performance data to which said tendency has been added.

SUMMARY

However, in the configuration of Non-Patent Document "Gerhard Widmer, Sebastian Flossmann, and Maarten Grachten,"YQX Plays Chopin," AI Magazine, Vol 30, No 3, p. 35-48, 2009", there is the problem that only one type of performance data can be generated from one type of musical score data. That is, it is not possible to generate various performance data in which a specific performer performs while employing various musical expressions. In consideration of such circumstances, an object of this disclosure is to generate performance data that represent various performances to which musical expressions have been added.

In order to solve the problem described above, an information processing method according to a preferred aspect of this disclosure includes the following. In addition, an information processing device that executes the following can be provided:

Generating performance data that represent a performance of a musical piece that reflects a change caused by a factor that alters the performance of the musical piece, by inputting musical score data, which represent a musical score of the musical piece, and variability data, which represent the factor, into a trained model.

The information processing method according to another aspect of this disclosure includes the following. In addition, an information processing device that executes the following can be provided:

generating variability data, which are change variables that represent a factor that alters a performance of a musical piece, and which follow a specific probability distribution, by inputting first training data, which include performance data that represent the performance of the musical piece, into a first provisional model;

generating estimation data that represent the performance of the musical piece that reflects a change caused by the factor, by inputting second training data, which include musical score data that represent a musical score of the musical piece and the variability data generated by the first provisional model, into a second provisional model; and updating a plurality of coefficients that define the first provisional model and a plurality of coefficients that define the second provisional model, such that the performance data of the first training data and the estimation data generated by the second provisional model approach to each other, and such that a probability distribution of the variability data generated by the first provisional model approaches a specific target distribution.

BRIEF DESCRIPTION OF THE DRAWINGS

Referring now to the attached drawings which form a part of this original disclosure.

DETAILED DESCRIPTION OF THE EMBODIMENTS

Selected embodiments will now be explained in detail below, with reference to the drawings as appropriate. It will be apparent to those skilled from this disclosure that the following descriptions of the embodiments are provided for illustration only and not for the purpose of limiting the invention as defined by the appended claims and their equivalents.

First Embodiment

Figure 1:
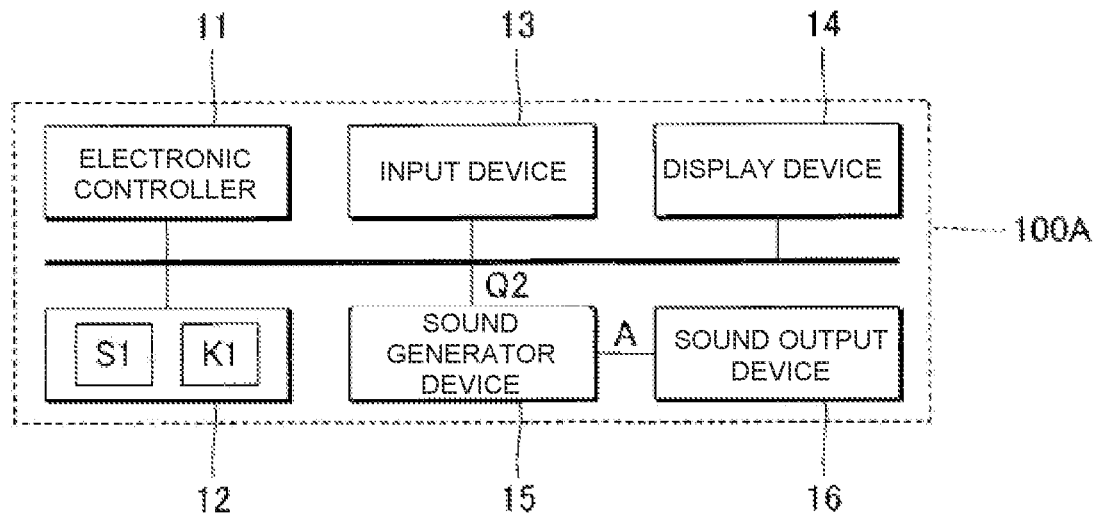
FIG. 1 is a block diagram illustrating the configuration of an information processing device according to a first embodiment.

FIG. 1 is a block diagram illustrating the configuration of an information processing device 100A according to a first embodiment. As shown in FIG. 1, the information processing device 100A according to the first embodiment is realized by a computer system that includes an electronic controller 11, a storage device 12, an input device 13, a display device 14, a sound generator device (sound generator) 15, and a sound output device 16. For example, an information terminal, such as a mobile phone, a smartphone, or a personal computer, can be suitably used as the information processing device 100A.

The display device 14 is controlled by the control of the electronic controller 11 for the display of various images. For example, a display such as a liquid-crystal display panel can be suitably used as the display device 14. The input device 13 receives operations from a user. An operator operated by the user (user operable input), or a touch panel integrally that is configured with the display device 14, for example, can be used as the input device 13. A sound collection device capable of voice input can also be used as the input device 13.

The electronic controller 11 is a processing circuit (processor) such as a CPU (Central Processing Unit), which comprehensively controls each element of the information processing device 100A. The term "electronic controller" as used herein refers to hardware that executes software programs. The electronic controller 11 can be configured to comprise, instead of the CPU or in addition to the CPU, programmable logic devices such as a DSP (Digital Signal Processor), an FPGA (Field Programmable Gate Array), and the like. In addition, the electronic controller 11 can include a plurality of CPUs (or a plurality of programmable logic devices). The storage device 12 is a memory including a known storage medium, such as a magnetic storage medium or a semiconductor storage medium, in which is stored a program executed by the electronic controller 11 and various data used by the electronic controller 11. The storage device 12 can be configured through the combination of a plurality of types of recording media. The storage device 12 can be any computer storage device or any computer readable medium with the sole exception of a transitory, propagating signal. A portable storage medium, which can be attached to and detached from the information processing device 100A, or an external storage medium (for example, online storage) with which the information processing device 100A can communicate via a communication network, can also be used as the storage device 12.

The storage device 12 of the first embodiment stores musical score data S1 that represent the musical score of a musical piece. The musical score data S1 specify a time series of a plurality of musical notes constituting a musical score, as well as music symbols (for example, clefs, time signatures, accidentals, and performance symbols) relating to the performance of the musical piece. For example, files in the MIDI (Musical Instrument Digital Interface) format or the MusicXML (extensible Markup Language) format are suitable as the musical score data S1.

The information processing device 100A according to the first embodiment generates performance data Q2 from the musical score data S1 stored in the storage device 12. The performance data Q2 represent the performance of a musical piece represented by the musical score data S1. The performance represented by the performance data Q2 is a performance in which musical expressions have been added to the musical score represented by the musical score data S1. A musical expression is an expressional feature that has been added to a performance as a result of the performer's musical intentions or habitual movements during performance. For example, performance data Q2 to which various tendencies relating to the performance of a musical piece have been added, such as the tendency to play each note shorter than the time specified by the musical score, or the tendency to play each note before or after the time specified in the musical score, are generated.

The sound generator device 15 generates an audio signal A corresponding to the performance data Q2. The audio signal A is a time signal that represents sound (for example, the performance sound of a musical instrument) generated by the performance represented by the performance data Q2. The sound output device 16 reproduces the sound represented by the audio signal A generated by the sound output device 15. For example, a speaker or headphones are suitably used as the sound output device 16. The graphical representation of a D/A converter which converts the audio signal A that is produced by the sound generator device 15 from digital to analog and of an amplifier which amplifies the audio signal A have been omitted for the sake of convenience. In addition, the sound generator device 15 and the sound output device 16 can be installed externally to the information processing device 100A. For example, a sound generator device 15 or a sound output device 16 which is separate from the information processing device 100A can be connected to the information processing device 100A wirelessly or via wire.

Figure 2:
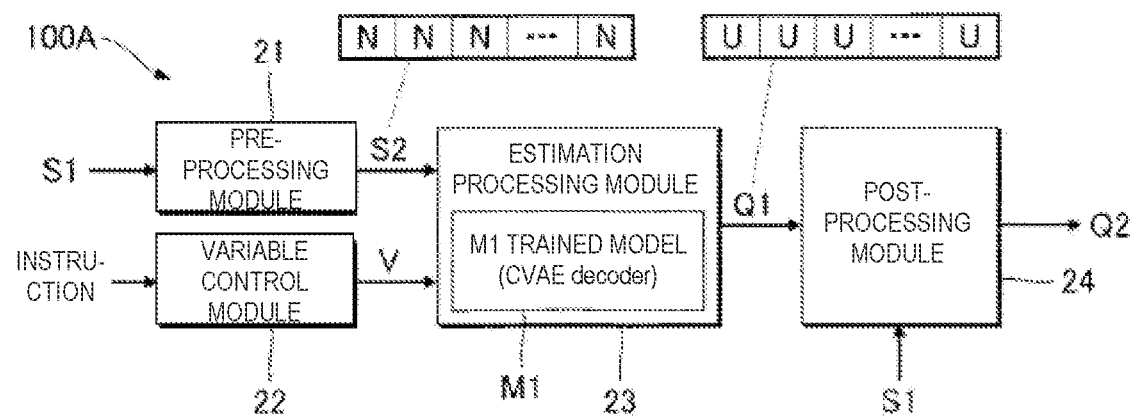
FIG. 2 is a block diagram illustrating the functional configuration of an information processing device according to the first embodiment.

FIG. 2 is a block diagram illustrating the functional configuration of the information processing device 100A. As shown in FIG. 2, the electronic controller 11 executes a program stored in the storage device 12 in order to execute a plurality of modules (pre-processing module 21, variable control module 22, estimation processing module 23, and post-processing module 24) for generating the performance data Q2 from the musical score data S1 to realize a plurality of functions. Moreover, the modules (functions) of the electronic controller 11 can be realized by a plurality of separately configured devices, or, some or all of the functions of the electronic controller 11 can be realized by one or more dedicated electronic circuits.

The pre-processing module 21 generates musical score data S2 from the musical score data S1 stored in the storage device 12. The musical score data S2 represent the musical score of a musical piece. The musical score data S2 according to the first embodiment include a time series of musical note data N that correspond to a plurality of different musical notes of the musical piece that is represented by the musical score data S1. The musical note data N that correspond to any one musical note (hereinafter referred to as a "first note") specify information relating to the performance of said first note. Specifically, the musical note data N of the first note include at least one type of information from among a plurality of types of information (n1-n10)) illustrated below.

n1: time signature of the musical piece (for example, 2/4 time signature)
n2: key signature of the musical piece (for example, C major, A minor, etc.)
n3: pitch of the first note (for example, the MIDI note number)
n4: note value of the first note (that is, the duration)
n5: position of the first note in the bar (for example, first beat, second beat, etc., of the bar)
n6: time difference between the sound generation points of the first note n1 and the immediately preceding note
n7: performance intensity of the first note (for example, the MIDI velocity)
n8: performance symbol of the first note (for example, the articulation, such as staccato)
n9: performance speed of the first note (for example, tempo represented by BPM (Beats Per Minute))
n10: feature vector that represents the feature of the segment that include the first note The feature vector n10 is a vector that represents the features of a sequence of notes, in the form of, e.g., a piano roll, in a segment of the musical piece centered on the first note. For example, a machine-trained convolutional neural network (CNN) is input into the musical score data S1 in order to generate the feature vector n10. The pre-processing module 21 specifies the information (n1-n10) described above for each note by analyzing the musical score data S1 in order to generate the musical score data S2.

The information included in the musical note data N such as n1-n9 can be expressed as continuous values or as a one-hot expression.

The estimation processing module 23 of FIG. 2 generates the performance data Q1 from the musical score data S2 generated by the pre-processing module 21. The performance data Q1 are data that represent the performance of a musical piece to which musical expressions have been added. The performance data Q1 according to the first embodiment include a time series of unit data U that correspond to a plurality of different musical notes of the musical piece represented by the musical score data S2. The estimation processing module 23 generates the unit data U of the one musical note from the musical note data N of each musical note of the musical score data S2. That is, the unit data U is generated for each musical note of the musical piece. The unit data U corresponding to any one musical note (hereinafter referred to as the "second note") specify information relating to the performance of said second note. Specifically, the unit data U of the second note include at least one type of information from among a plurality of the types of information illustrated below.

u1: performance intensity of the second note (for example, the MIDI velocity)
u2: time difference between the sound generation point specified for the second note by the musical score data S2 and the sound generation point of the second note due to the performance (that is, the error in the sound generation point at the time of performance)
u3: difference between the duration specified for the second note by the musical score data S2 and the duration of the second note due to the performance (that is, the error in duration at the time of performance)
u4: difference between the performance speed specified for the second note by the musical score data S2 and the performance of the second note due to the performance (that is, the error in the performance speed at the time of performance)

The information included in the unit data U such as u1-u4 can be expressed as continuous values or as a one-hot expression. When a one-hot expression is used, the performance data Q1 including the unit data U comes to represent a well-modulated performance. Well-modulated means that the data can take on a wide range of values. When the unit data U are expressed as continuous values rather than a one-hot expression, the variability of the unit data U becomes small, so that performance data Q1 tend to be slightly less well-modulated compared with a human performance.

As shown in FIG. 2, the estimation processing module 23 according to the first embodiment generates the performance data Q1 by inputting the musical score data S2 and variability data V into the trained model M1 in order to. The variability data V are expressed as a multidimensional vector that represents one or more factors that change the performance of the musical piece. In other words, the variability data V are data that represent the musical expressions that are added to the performance of the musical piece. The performance data Q1 generated by the estimation processing module 23 represent the performance of the musical piece that reflect one or more changes represented by the variability data V. That is, the performance data Q1 represent a performance to which the musical expressions that correspond to the variability data V have been added.

A trained model M1 is a statistical predictive model obtained through the learning of the relationships between the performance data Q1 and input data that include the musical score data S2 and the variability data V. Specifically, the trained model M1 includes a neural network. For example, the trained model M1 includes a plurality of long short-term memories (LSTM) interconnected in series. Therefore, performance data Q1 are generated which reflect the time series of the musical note data N of the plurality of consecutive musical notes in the musical score data S2.

The trained model M1 is realized by combining a program (for example, a program module constituting artificial intelligence software), which causes the electronic controller 11 to execute computations to generate the performance data Q1 from the musical score data S2 and the variability data V, and a plurality of coefficients K1 that are applied to the computations. The plurality of coefficients K1 which define the trained model M1 are set by means of machine learning (particularly, deep learning) that utilizes a large amount of training data and are stored in the storage device 12. The machine learning of the trained model M1 will be described further below.

The trained model M1 according to the first embodiment is configured to include a VAE (Variational Auto Encoder) decoder. Specifically, the trained model M1 is a CVAE (Conditional VAE) decoder that includes known conditions as inputs. The musical score data S2 correspond to the known conditions of the CVAE, and the variability data V correspond to latent variables of the CVAE.

Figure 3:
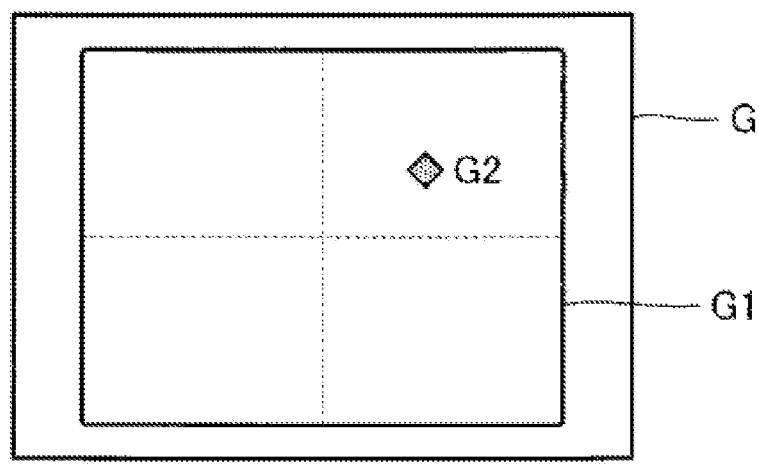
FIG. 3 is a schematic diagram of an operation screen.

The variable control module 22 of FIG. 2 variably sets the variability data V. The variable control module 22 according to the first embodiment sets the variability data V in response to user instructions input to the input device 13. FIG. 3 is a schematic diagram of an operation screen G, which the user visually checks to set the variability data V. The variable control module 22 causes the display device 14 to display the operation screen G. The operation screen G is an image that includes a coordinate plane G1 and an indicator G2. The coordinate plane G1 represents a two-dimensional plane in which the number of dimensions of the variability data V have been reduced for the sake of convenience. The user can operate the input device 13 to change the position of the indicator G2 on the coordinate plane G1. The variable control module 22 sets the variability data V in accordance with the position of the indicator G2 on the coordinate plane G1.

The post-processing module 24 of FIG. 2 generates the performance data Q2 from the performance data Q1 generated by the estimation processing module 23 and the musical score data S1 stored in the storage device 12. More specifically, the post-processing module 24 changes the information relating to each musical note specified by the musical score data S1 in accordance with the performance data Q1 in order to generate the performance data Q2. For example, the performance intensity of each note specified by the musical score data S1 is changed to the performance intensity u1 specified by the unit data U of said musical note. The sound generation point of each note specified by the musical score data S1 is adjusted in accordance with the time difference u2 specified by the unit data U of the musical note. The duration of each note specified by the musical score data S1 is adjusted in accordance with the difference u3 specified by the unit data U, and the performance speed of each note specified by the musical score data S1 is adjusted in accordance with the difference u4 specified by the unit data U. The performance data Q2 generated by the post-processing module 24 is a file in the MIDI format or MusicXML format, for example, in the same manner as the musical score data S1.

Figure 4:
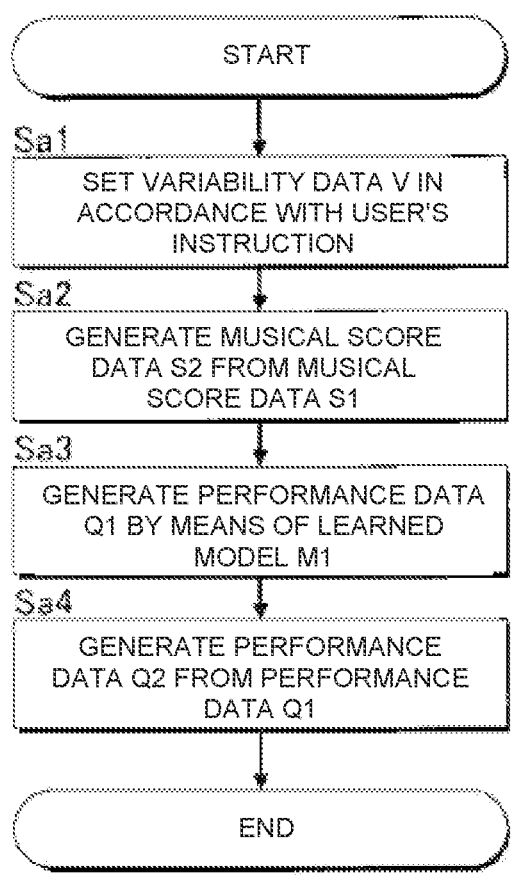
FIG. 4 is a flowchart illustrating the operation of the information processing device according to the first embodiment.

FIG. 4 is a flowchart showing the specific procedure of a process in which the electronic controller 11 generates the performance data Q2 from the musical score data S1. The process of FIG. 4 is initiated when the user inputs an instruction to the input device 13, for example.

When the process of FIG. 4 is started, the variable control module 22 sets the variability data V in accordance with the user instruction to the input device 13 (Sa1). The pre-processing module 21 generates the musical score data S2 from the musical score data S1 stored in the storage device 12 (Sa2). The estimation processing module 23 inputs to the trained model M1 the musical note data N of each note of the musical score data S2 generated by the pre-processing module 21 and the variability data V set by the variable control module 22, in order to generate the unit data U of each note of the performance data Q1 (Sa3). The post-processing module 24 generates the performance data Q2 from the musical score data S1 and the performance data Q1 generated by the estimation processing module 23 (Sa4).

As described above, in the first embodiment, since the musical score data S2 and the variable variability data V are input to the trained model M1 in order to generate the performance data Q1, it is possible to generate the performance data Q1 that represent various performances corresponding to the variability data V with respect to the musical score data S2 of one musical piece.

Second Embodiment

A second embodiment will now be described. In each of the examples below, elements that have the same functions as those used in the description of the first embodiment have been assigned the same reference numerals, and their detailed descriptions have been omitted, as deemed appropriate. The information processing device 100A according to the first embodiment generates the performance data Q2 from the musical score data S1 and the variability data V. An information processing device 100B according to the second embodiment generates the variability data V from the musical score data S1 and the performance data Q2.

Figure 5:
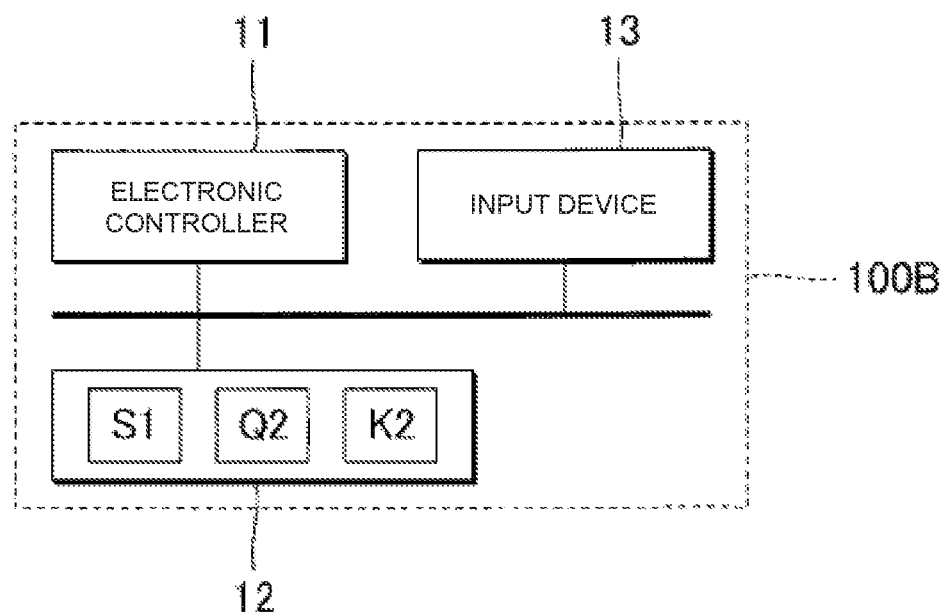
FIG. 5 is a block diagram illustrating the configuration of an information processing device according to a second embodiment.

FIG. 5 is a block diagram illustrating the configuration of the information processing device 100B according to the second embodiment. As shown in FIG. 5, the information processing device 100B according to the second embodiment includes the electronic controller 11, the storage device 12, and the input device 13. As shown in FIG. 5, the musical score data S1 and the performance data Q2 are stored in the storage device 12 according to the second embodiment. The performance data Q2 have been stored in advance in the storage device 12 and are from a recording of a performance by the user. The performance represented by the performance data Q2 is a performance in which musical expressions have been arbitrarily added by the user to the musical score represented by the musical score data S1. The performance data Q2 stored in the storage device 12 represent the performance of each of various performances to which different musical expressions have been added. The user can appropriately operate the input device 13 to select the performance data Q2 of any one performance from the performance data Q2 of the plurality of performances stored in the storage device 12 as the processing target.

Figure 6:
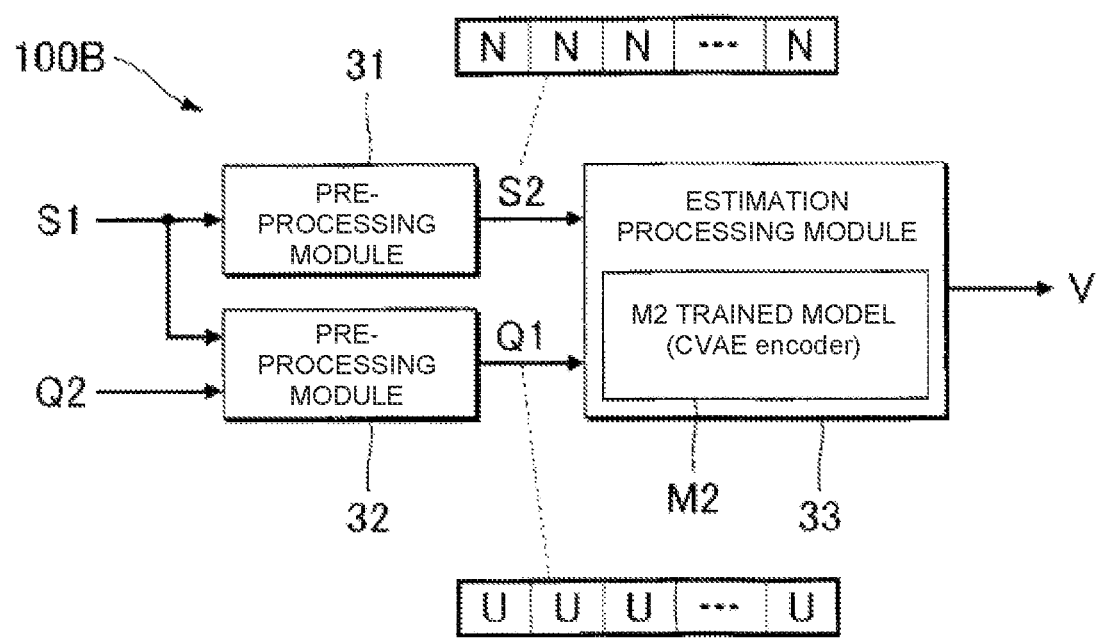
FIG. 6 is a block diagram illustrating the functional configuration of an information processing device according to the second embodiment.

FIG. 6 is a block diagram illustrating a functional configuration of the information processing device 100B according to the second embodiment. As shown in FIG. 6, the electronic controller 11 executes a program stored in the storage device 12 in order to realize a plurality of functions (pre-processing module 31, pre-processing module 32, and estimation processing module 33) for generating variability data V from the performance data Q2 from the musical score data S1.

The pre-processing module 31 generates the musical score data S2 from the musical score data S1 in the same manner as the pre-processing module 21 in the first embodiment. The musical score data S2 include a time series of musical note data N corresponding to a plurality of different musical notes of the musical piece represented by the musical score data S1, as described above.

The pre-processing module 32 generates the performance data Q1 from the performance data Q2 of a performance selected by the user from among the performance data Q2 of a plurality of performances stored in the storage device 12. As described above, the performance data Q1 include a time series of the unit data U corresponding to the plurality of different musical notes of the musical piece. The pre-processing module 32 generates the performance data Q1 from the performance data Q2 and the musical score data S1. More specifically, the pre-processing module 32 compares the performance data Q2 and the musical score data S1 in order to generate the unit data U sequentially that specify a plurality of types of information (u1-u4).

The estimation processing module 33 generates the variability data V from the musical score data S2 generated by the pre-processing module 31 and the performance data Q1 generated by the pre-processing module 32. More specifically, a set of the musical note data N of the musical score data S2 and the unit data U of the performance data Q1 is sequentially generated for each note, and the variability data V is sequentially generated for each of these sets. As described above, the variability data V are vectors that represent one or more factors that alter the performance of the musical piece. The variability data V of the second embodiment correspond to data that represent the musical expressions that have been added to the performance represented by the performance data Q1. Since the musical expression differs as a function of the performance data Q1, the variability data V generated by the estimation processing module 33 according to the second embodiment differ as a function of the performance data Q1.

As shown in FIG. 6, the estimation processing module 33 according to the second embodiment inputs the musical score data S2 and the performance data Q1 into a trained model M2 in order to generate the variability data V. The trained model M2 is a statistical predictive model obtained by the learning of the relationships between the variability data V and input data that include the musical score data S2 and the performance data Q1. Specifically, the trained model M2 includes of a neural network. For example, the trained model M2 includes a plurality of long short-term memories (LSTM) interconnected in series, in the same manner as the trained model M1. Therefore, the variability data V, which reflects the time series of the musical note data N of the plurality of consecutive musical notes in the musical score data S2, and the time series of the unit data U of the plurality of consecutive musical notes in the performance data Q1, are generated.

The trained model M2 is realized by combining a program (for example, a program module constituting artificial intelligence software), which causes the electronic controller 11 to execute computations to generate the variability data V from the musical score data S2 and the performance data Q1, with the plurality of coefficients K2 that are applied to the computations. The plurality of coefficients K2 which define the trained model M2 are set by means of machine learning (particularly, deep learning) that utilizes a large amount of training data and are stored in the storage device 12. The machine learning of the trained model M2 will be described further below.

The trained model M2 according to the second embodiment is configured to include a VAE encoder. Specifically, the trained model M2 is a CVAE encoder that includes known conditions as inputs. The musical score data S2 correspond to the known conditions of the CVAE, and the variability data V correspond to latent variables of the CVAE. That is, the trained model M2 determines the mean and variance of a probability distribution corresponding to the musical note data N of the musical score data S2 and the unit data U of the performance data Q1, and extracts (samples) the variability data V from the probability distribution.

Figure 7:
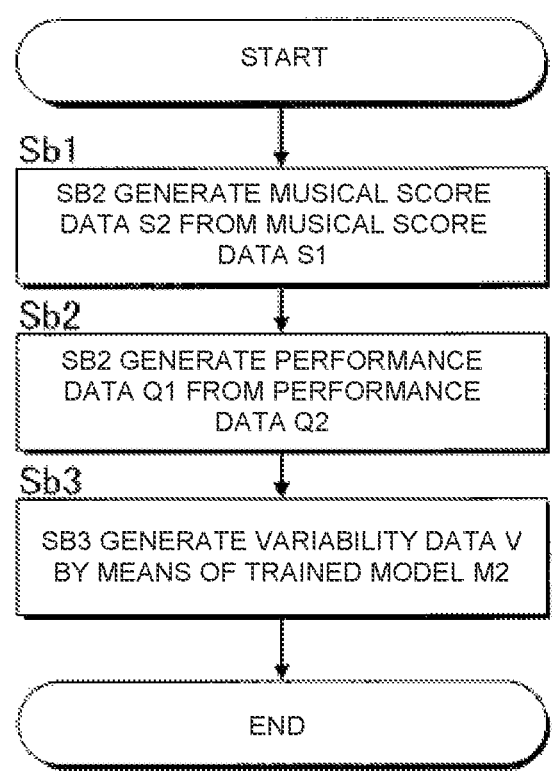
FIG. 7 is a flowchart illustrating the operation of the information processing device according to the second embodiment.

FIG. 7 is a flowchart showing a specific procedure of the process in which the electronic controller 11 generates the variability data V from the musical score data S1 and the performance data Q2. The process of FIG. 7 is initiated when the user inputs an instruction to the input device 13, for example.

Then the process of FIG. 7 is started, the pre-processing module 31 generates the musical score data S2 from the musical score data S1 (Sb1). In addition, the pre-processing module 32 generates the performance data Q1 from the performance data Q2 selected by the user by means of an operation of the input device 13 (Sb2). The order of the generation of the musical score data S2 (Sb1) and the generation of the performance data Q1 (Sb2) can be reversed. In order to generate the variability data V for each note (Sb3), the estimation processing module 33 inputs into the trained model M2 the musical note data N of each note of the musical score data S2 generated by the pre-processing module 31 and the unit data U of each note of the performance data Q1 generated by pre-processing module 32.

As described above, in the second embodiment, since the musical score data S2 and the performance data Q1 are input into the trained model M2 in order to generate the variability data V, it is possible to generate, without utilizing the musical score data S2, the appropriate variability data V, which depend less on the musical score relative to a configuration in which the variability data V are generated using a trained model obtained by the learning of the relationships between the performance data Q1 and the variability data V.

The time series of the variability data V generated by the estimation processing module 33 is used for a variety of purposes. For example, the musical expression represented by the variability data V can be added to the musical score data S1 of any musical piece except the musical piece used for the generation of the variability data V by means of the configuration of the first embodiment, in order to generate the performance data Q2 that represent the performance of a case in which the musical expression represented by the variability data V has been added to any musical piece.

In addition, the performance data Q2 that represent a performance by the performer can be supplied to the pre-processing module 32 in parallel with the performance in real time, and the estimation processing module 33 can generate the variability data V corresponding to the performance data Q2 in parallel with the real-time performance. The performance data Q2 are generated as a result of the addition of the musical expressions of the variability data V to the musical score data S1 of the musical piece performed by the performer, and the performance data Q2 are supplied to an automatic performance instrument in parallel with the performance by the performer. The automatic performance instrument can be a keyboard instrument, for example, which is capable of playing automatically and executing an automatic performance of the musical piece in accordance with the performance data Q2. By means of the configuration described above, it is possible to carry out an automatic performance of a musical piece having the same musical expressions as the performer's performance, in parallel with said performance.

Third Embodiment

Figure 8:
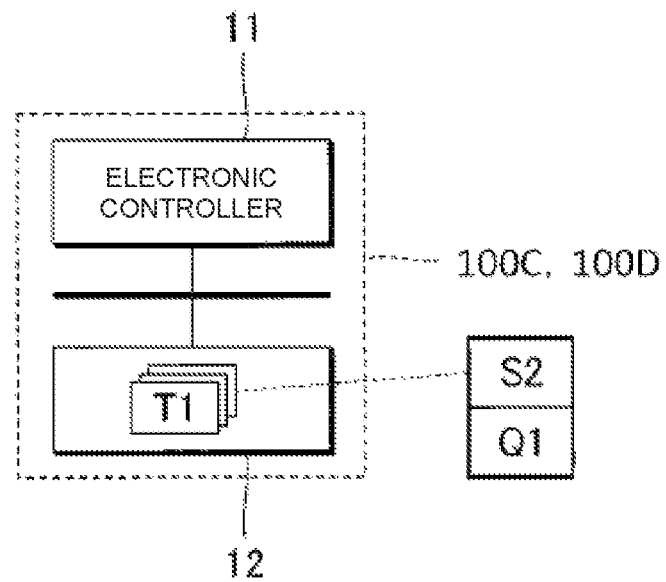
FIG. 8 is a block diagram illustrating the configuration of an information processing device according to a third and fourth embodiment.

FIG. 8 is a block diagram illustrating the configuration of the information processing device 100C according to a third embodiment. The information processing device 100C according to the third embodiment is a machine learning device, which generates via machine learning the trained model M1 of the first embodiment and the trained model M2 of the second embodiment, and is provided with the electronic controller 11 and the storage device 12, as shown in FIG. 8.

As shown in FIG. 8, the storage device 12 according to the third embodiment stores a plurality of sets of training data T1 (example of the first training data) utilized for machine learning. Each set of the training data T1 is configured to include the musical score data S2 that represent the musical score of a musical piece and the performance data Q1 that represent the performance of said musical piece. The musical score data S2 include a time series of the musical note data N corresponding to a plurality of different musical notes of the musical piece, as is illustrated in the first embodiment and the second embodiment. The performance data Q1 include a time series of the unit data U corresponding to the plurality of different musical notes of the musical piece, as is illustrated in the first embodiment and the second embodiment. A plurality of sets of the training data T1, where each set includes the performance data Q1 of a plurality of performances having different musical expressions, are stored in the storage device 12 for a plurality of musical pieces.

Figure 9:
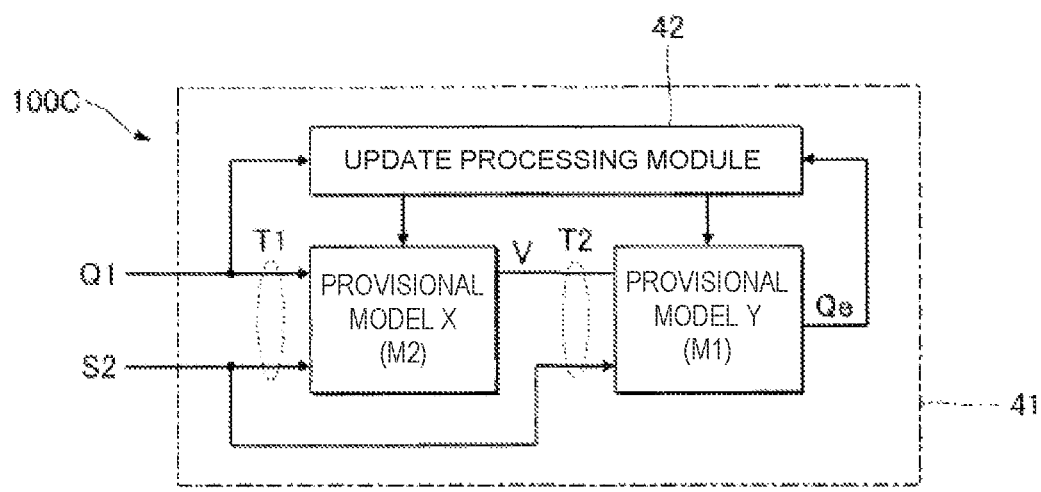
FIG. 9 is a block diagram illustrating the functional configuration of the information processing device according to the third embodiment.

FIG. 9 is a block diagram illustrating the functional configuration of the information processing device 100C according to the third embodiment. As shown in FIG. 9, the electronic controller 11 according to the third embodiment executes a program stored in the storage device 12 in order to function as a learning processing module 41 that carries out machine learning for generating the trained model M1 of the first embodiment and the trained model M2 of the second embodiment. The learning processing module 41 is configured to include an update processing module 42. The update processing module 42 iteratively updates the plurality of coefficients K1 that define the trained model M1 and the plurality of coefficients K2 that define the trained model M2.

As shown in FIG. 9, the learning processing module 41 executes machine learning with respect to a provisional model X and a provisional model Y. The provisional model X (example of a first provisional model) is a provisional model of the trained model M2 in the process of learning. That is, the provisional model X, which is at the stage at which the updating of the plurality of coefficients K2 by means of machine learning has been completed, is used as the trained model M2 according to the second embodiment. The provisional model Y (example of a second provisional model), on the other hand, is a provisional model of the trained model M1 in the process of learning. That is, the provisional model Y, which is at the stage at which the updating of the plurality of coefficients K1 by means of machine learning has been completed, is used as the trained model M1 according to the first embodiment.

As shown in FIG. 9, the training data T1, which includes the musical score data S2 and the performance data Q1, are input into the provisional model X. The provisional model X is a CVAE encoder that generates the variability data V (latent variables) from the training data T1. Training data T2 (example of second training data), on the other hand, which includes the musical score data S2 of the training data T1 and the variability data V generated by the provisional model X, are input into the provisional model Y. The provisional model Y is a CVAE decoder that generates the performance data Q1 (hereinafter referred to as "estimation data Qe") from the training data T2.

The update processing module 42 iteratively updates the plurality of coefficients K2 of the provisional model X and the plurality of coefficients K1 of the provisional model Y, so that the performance data Q1 of the training data T1 and the estimation data Qe generated by the provisional model Y are brought lose to each other, and so that the probability distribution of the variability data V generated by the provisional model X approach (are brought close) to a specific probability distribution (hereinafter referred to as the "target distribution"). The target distribution is a normal distribution (0, 1) with a mean of 0 and a variance of 1, for example. Specifically, the learning processing module 41 iteratively updates the plurality of coefficients K1 and the plurality of coefficients K2 by means of the stochastic gradient descent method, so as to reduce (ideally, minimize) the evaluation function F expressed by Equation (1) below.

$$F = La(Q1, Q_\theta) + Lb(\lambda(V), N(0,1)) \qquad (1)$$

The first term (La (Q1, Qe)) on the right side of Equation (1) corresponds to the error between the performance data Q1 and the estimation data Qe. In practice, errors E between the unit data U of the performance data Q1 and the unit data U of the estimation data Qe are summed over a plurality of musical notes in a musical piece in order to calculate an error La (Q1, Qe). The second term (Lb ($\lambda$(V), N (0,1))) on the right side of Equation (1), on the other hand, corresponds to the error (for example, KL divergence) between a probability distribution $\lambda$ (V) of the variability data V and the target distribution N (0,1). As can be understood from the foregoing explanation, by minimizing the evaluation function F, the performance data Q1 and the estimation data Qe can be brought close to each other, and the probability distribution $\lambda$ (V) of the variability data V is brought close to the target distribution N (0,1)

The error E between the unit data U (u1-u4) of the performance data Q1 and the unit data U (u1-u4) of the estimation data Qe is the sum of the error e1 of the performance intensity u1, the error e2 of the time difference u2 of the sound generation point, the error e3 of the difference u3 of the duration, and the error e4 of the difference u4 of the performance speed.

In the present embodiment, the performance intensity u1 corresponds to any one numerical value from among Z stages of numbers distributed within a range from a minimum value to a maximum value. The performance intensity u1 is expressed as a Z-dimensional performance intensity vector (one-hot expression) in which one of Z elements that corresponds to the numerical value of the performance intensity u1 is set to 1, and the remaining (Z-1) elements are set to 0. The error e1 of the performance intensity u1 between the performance data Q1 and the estimation data Qe is, for example, the mutual entropy of the performance intensity vector of the performance data Q1 with respect to the performance intensity vector of the estimation data Qe.

The error e2 of the time difference u2 of the sound generation point is the absolute value |u2(Qe)−u2(Q1)| of the difference between the time difference u2 (Q1) specified by the unit data U of the performance data Q1, and the time difference u2 (Qe) specified by the unit data U of the estimation data Qe. Similarly, the error e3 of the difference u3 of the duration is the absolute value |u3(Qe)−u3(Q1)| of the difference between the difference u3 (Q1) of the duration specified by the unit data U of the performance data Q1 and the difference u3 (Qe) of the duration specified by the unit data U of the estimation data Qe. The error e4 of the difference u4 of the performance speed is the absolute value |u4(Qe)−u4(Q1)| of the difference between the difference u4 (Q1) of the performance speed specified by the unit data U of the performance data Q1 and the difference u4 (Qe) of the performance speed specified by the unit data U of the estimation data Qe.

Figure 10:
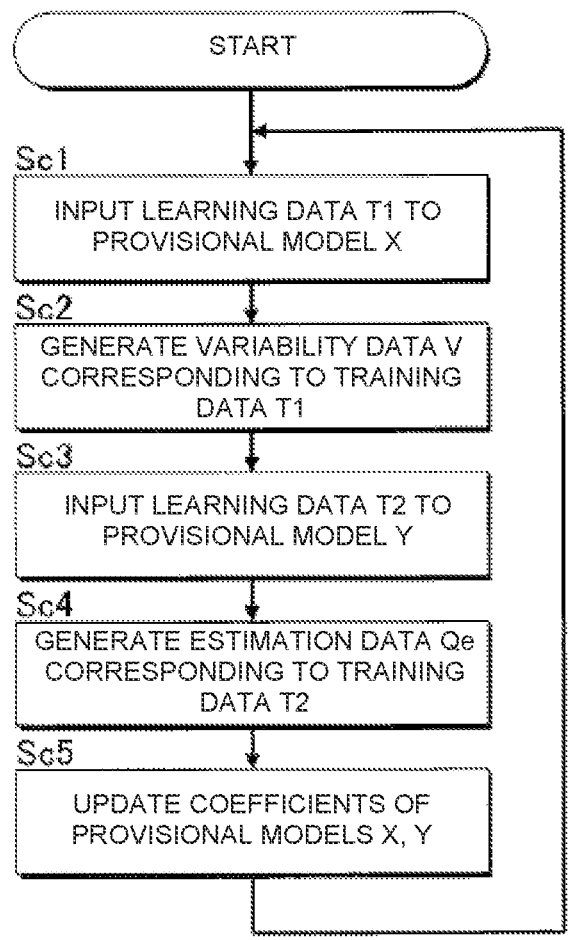
FIG. 10 is a flowchart illustrating the operation of the information processing device according to the third embodiment.

FIG. 10 is a flowchart showing the specific procedure of a process (machine learning method) in which the electronic controller 11 generates the trained model M1 and the trained model M2. The process of FIG. 10 is initiated when the user inputs an instruction, for example.

When the process of FIG. 10 is started, the learning processing module 41 inputs the training data T1 stored in the storage device 12 into the provisional model X (Sc1). The provisional model X generates the variability data V corresponding to the training data T1 (Sc2). The learning processing module 41 inputs the training data T2, which includes the musical score data S2 of the training data T1 and the variability data V generated by the provisional model X, into the provisional model Y (Sc3). The provisional model Y generates the estimation data Qe corresponding to the training data T2 (Sc4). The update processing module 42 updates the plurality of coefficients K2 of the provisional model X and the plurality of coefficients K1 of the provisional model Y so that the performance data Q1 and the estimation data Qe are brought close to each other, and so that the probability distribution λ (V) of the variability data V is brought close to the target distribution N (0,1) (Sc5). The trained model M1 and the trained model M2 are generated by repeating the process (Sc1-Sc5) described above for a plurality of sets of the training data T1.

As described above, by means of the third embodiment, it is possible immediately to generate the trained model M2 that can generate the appropriate variability data V which depend less on the musical score, and the trained model M1 that can generate the performance data Q1 that represent various performances corresponding to the variability data V with respect to the musical score data S2 of one musical piece.

Fourth Embodiment

FIG. 8 illustrates the configuration of the information processing device 100C according to the third embodiment, as well as a configuration of an information processing device 100D according to a fourth embodiment. The information processing device 100C and the information processing device 100D according to the two embodiments have the same hardware configuration, and include the electronic controller 11 and the storage device 12. In addition, the information processing device 100D according to the fourth embodiment also has various elements that are common to those described above with regard to the first to the third embodiments in terms of the software configuration. Thus, for the sake of simplicity, elements with the same reference symbols have the same configuration and function unless otherwise specified.

As shown in FIG. 8, according to the fourth embodiment, a plurality of sets of the training data T1 are also stored in the storage device 12, in the same manner as the information processing device 100C according to the third embodiment. The performance data Q1 included in each set of the training data T1 are training data for learning a provisional model X4, and the musical score data S2 included in each set of the training data T1 are training data for machine-learning a provisional model Y4. Once trained, the provisional model X4 becomes a trained model M42, and once trained, the provisional model Y4 becomes a trained model M41.

Figure 11:
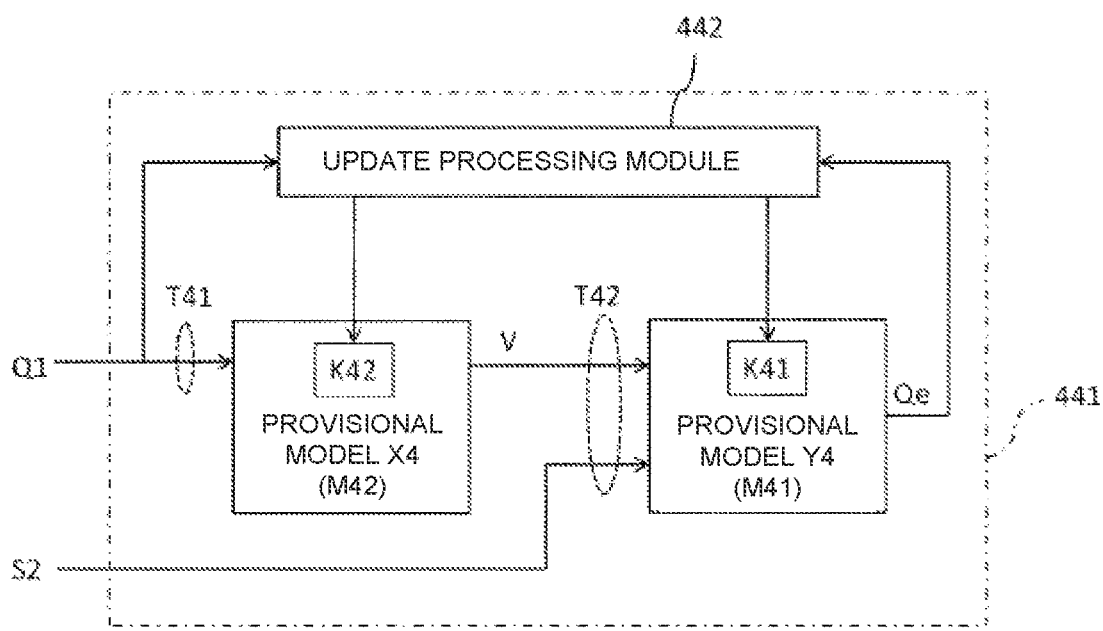
FIG. 11 is a block diagram illustrating the functional configuration of the information processing device according to the fourth embodiment.

FIG. 11 is a block diagram illustrating the functional configuration of the information processing device 100D according to the fourth embodiment. As shown in FIG. 11, the electronic controller 11 according to the fourth embodiment executes a program stored in the storage device 12 in order to function as a learning processing module 441 that carries out machine learning for generating the two trained models M41 and M42. The learning processing module 441 is configured to include an update processing module 442. The update processing module 442 iteratively updates the plurality of coefficients K41 that define the trained model M41 and the plurality of coefficients K42 that define the trained model M42.

The learning processing module 441 executes machine learning with respect to the provisional model X4 and the provisional model Y4. The provisional model X4 (example of a first provisional model) is a provisional model of the trained model M42 in the process of learning. That is, the provisional model X4, which is at the stage at which the updating of the plurality of coefficients K42 by means of machine learning has been completed, is used as the trained model M42. The provisional model Y4 (example of a second provisional model), on the other hand, is a provisional model of the trained model M41 in the process of learning. That is, the provisional model Y4, which is at the stage at which the updating of the plurality of coefficients K41 by means of machine learning has been completed, is used as the trained model M41.

The trained model M41 is a statistical predictive model obtained by learning the relationship between the performance data Q1 and input data that include the musical score data S2 and the variability data V, in the same manner as the trained model M1 according to the first embodiment. Specifically, the trained model M41 includes a neural network. For example, the trained model M41 includes a plurality of long short-term memories (LSTM) interconnected in series. Therefore, the performance data Q1, which reflect the time series of the musical note data N of the plurality of consecutive musical notes in the musical score data S2, are generated.

The trained model M41 is realized by combining a program (for example, a program module constituting artificial intelligence software), which causes the electronic controller 11 to execute computations to generate the performance data Q1 from the musical score data S2 and the variability data V, with the plurality of coefficients K41 that are applied to the computations. The plurality of coefficients K41 which define the trained model M41 are set by means of machine learning (particularly, deep learning) that utilizes a large amount of training data and are stored in the storage device 12.

The trained model M41 according to the fourth embodiment includes a decoder of a VRNN (Variational Recurrent Neural Network), which is a variant of a VAE (Variational Auto Encoder). Specifically, the trained model M14 is a CVRNN (Conditional VRNN) decoder that includes known conditions as inputs. The musical score data S2 correspond to the known conditions of the CVRNN, and the variability data V correspond to latent variables of the CVRNN.

On the other hand, the trained model M42 is a statistical predictive model obtained by the learning of the relationships between the variability data V and input data that include the performance data Q1, in the same manner as the trained model M2 according to the second embodiment. However, unlike the trained model M2, the musical score data S2 is not included in the input data. Specifically, the trained model M42 includes a neural network. For example, the trained model M42 includes a plurality of long short-term memories (LSTM) interconnected in series, in the same manner as the trained model M41. Therefore, the variability data V, which reflects the time series of the unit data U of the plurality of consecutive musical notes in the performance data Q1, are generated.

The trained model M42 is realized by combining a program (for example, a program module constituting artificial intelligence software), which causes the electronic controller 11 to execute computations to generate the variability data V from the performance data Q1, with the plurality of coefficients K42 that are applied to the computations. The plurality of coefficients K42 which define the trained model M42 are set by means of machine learning (particularly, deep learning) which utilizes a large amount of training data, and are stored in the storage device 12.

The trained model M42 according to the fourth embodiment includes a CVRNN encoder. Specifically, the variability data V correspond to the latent variables of the CVRNN. That is, the trained model M42 determines the mean and variance of a probability distribution corresponding to the unit data U of the performance data Q1, and extracts (samples) the variability data V from the probability distribution.

As shown in FIG. 11, the performance data Q1 are input to the provisional model X4 as training data T41 (example of first training data). The provisional model X4 is a CVRNN encoder that generates the variability data V (latent variables) from the training data T41. The training data T42 (example of second training data), on the other hand, which include the musical score data S2 of the training data T1 and the variability data V generated by the provisional model X4, are input to the provisional model Y4. The provisional model Y4 is a CVRNN decoder that generates the performance data Q1 (hereinafter referred to as "estimation data Qe") from the training data T42.

Figure 12:
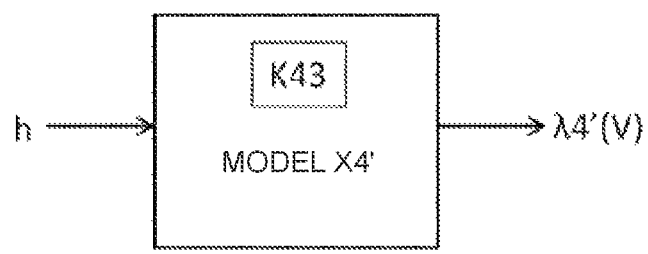
FIG. 12 is a diagram illustrating a model for generating a target distribution according to the fourth embodiment.
Figure 13:
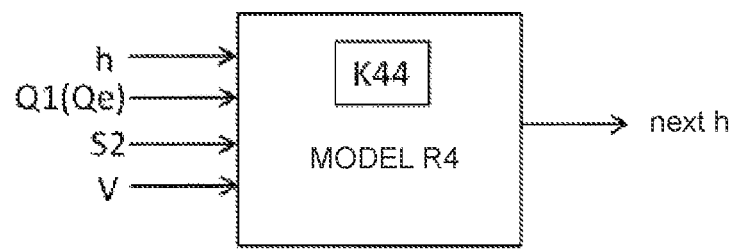
FIG. 13 is a diagram illustrating a model that defines a state variable according to the fourth embodiment.

The update processing module 442 iteratively updates the plurality of coefficients K42 of the provisional model X4 and the plurality of coefficients K41 of the provisional model Y4, so that the performance data Q1 of the training data T41 and the estimation data Qe generated by the provisional model Y4 are brought close to each other, and so that the probability distribution λ4 (V) of the variability data V generated by the provisional model X4 is brought close to a specific probability distribution (hereinafter referred to as "target distribution"). A target distribution λ4' (V) of the fourth embodiment is a normal distribution in accordance with the mean and variance of the variability data V, which is output from a prescribed model X4', which is a prior distribution (refer to FIG. 12). The model X4' has a state variable h in common with the provisional model X4. The state variable h is defined by a prescribed model R4, as shown in FIG. 13, and the model R4 according to the present embodiment is a model that uses as inputs the current state variable h, the performance data Q1 (can be the estimation data Qe), the musical score data S2, and the variability data V, and outputs the state variable h corresponding to the next musical note. The models X4' and R4 can both be configured from neural networks. In addition, the model R4 can include an RNN (multilayer LSTM, and the like). The models X4' and R4 are trained at the same time as the models M41 and M42. That is, a plurality of coefficients K43 of the model X4' and a plurality of coefficients K44 of the model R4 are iteratively updated together with the provisional models X4 and Y4 during the training process of the models M41 and M42. In this manner, the fourth embodiment differs from the third embodiment in that the target distribution λ4' (V) is learned.

Specifically, the learning processing module 441 iteratively updates the coefficients K41 and K42 as well as the coefficients K43 and K44 by means of the stochastic gradient descent method, so as to reduce (ideally, minimize) the evaluation function F4 expressed by Equation (2) below.

$$F4 = La(Q1, Qe) + Lb(\lambda 4(V), \lambda 4'(V)) \quad (2)$$

The first term (La (Q1, Qe)) on the right side of Equation (2) corresponds to the error between the performance data Q1 and the estimation data Qe. In practice, errors E between the unit data U of the performance data Q1 and the unit data U of the estimation data Qe are summed over a plurality of musical notes in a musical piece in order to calculate the error La (Q1, Qe). The error E can be calculated in the same manner as in the third embodiment. The second term (Lb (λ4 (V), λ4' (V))) on the right side of Equation (2), on the other hand, corresponds to the error (for example, KL divergence) between the probability distribution λ4 (V) of the variability data V and the target distribution λ4' (V). As can be understood from the foregoing explanation, by minimizing the evaluation function F4, the performance data Q1 and the estimation data Qe are brought close to each other, and the probability distribution λ4 (V) of the variability data V is brought close to the target distribution λ4' (V).

Figure 14:
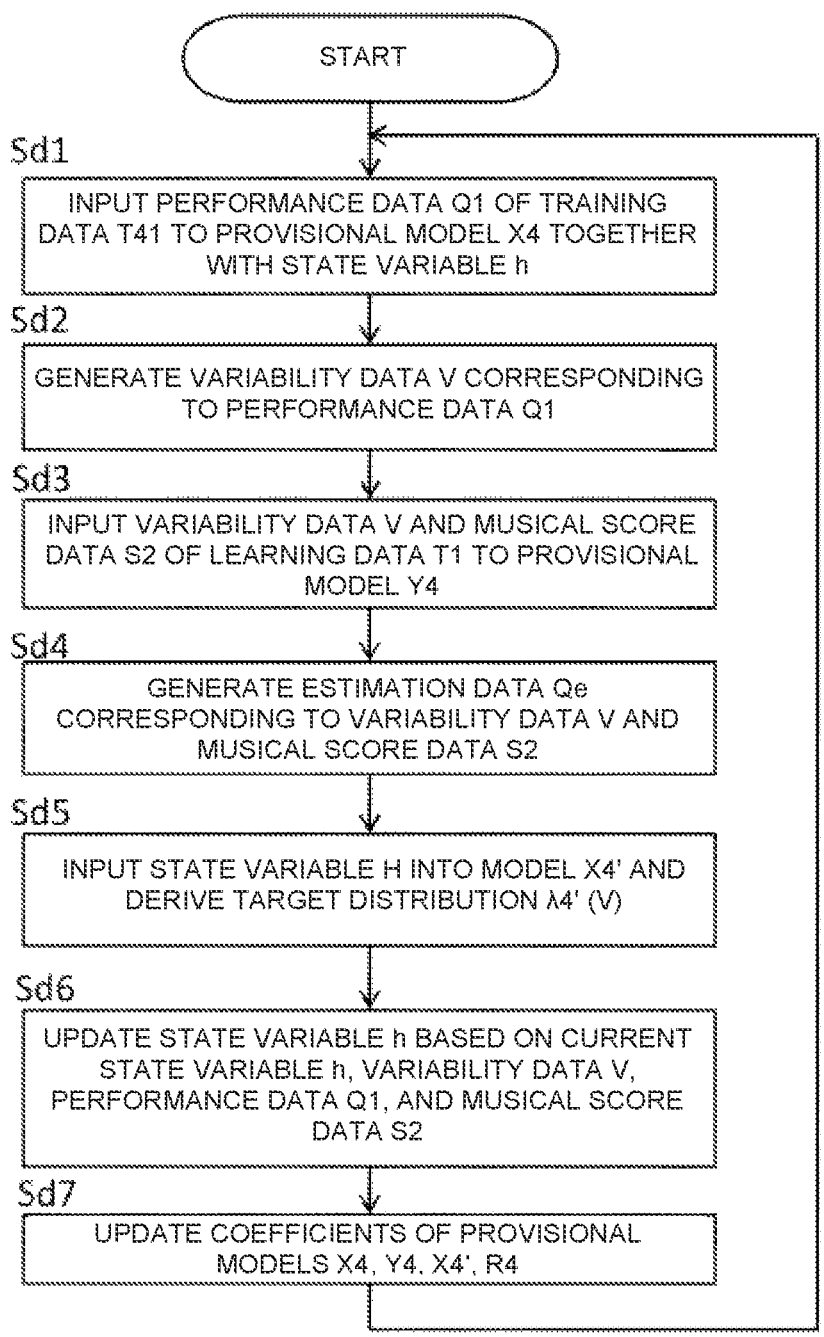
FIG. 14 is a flowchart illustrating the operation of the information processing device according to the fourth embodiment.

FIG. 14 is a flowchart showing the specific procedure of a process (machine learning method) in which the electronic controller 11 generates the trained models M41 and M42. The process of FIG. 14 is initiated when the user inputs an instruction, for example.

When the process of FIG. 14 is started, the learning processing module 441 inputs the performance data Q1 stored in the storage device 12 into the provisional model X4 as the training data T41, together with the state variable h (Sd1). As a result, the probability distribution λ4 (mean and variance) is derived. The provisional model X4 samples the variability data V from the probability distribution λ4 and generates the variability data V corresponding to the performance data Q1 (Sd2). The variability data V follow the specific probability distribution and are change variables that represent the factor that alters the performance of the musical piece. The learning processing module 441 inputs the training data T42, which includes the musical score data S2 stored in the storage device 12 and the variability data V generated by the provisional model X4 (Sd3), into the provisional model Y4. The provisional model Y4 generates the estimation data Qe corresponding to the training data T42 (Sd4). The estimation data Qe represent the performance of the musical piece that reflects the change caused by the factor. The learning processing module 441 inputs the state variable h into the model X4' and derives the target distribution λ4' (mean and variance) (Sd5). The update processing module 442 inputs the variability data V generated by the provisional model X4, the performance data Q1 stored in the storage device 12 (can be the estimation data Qe generated by the provisional model Y4), and the musical score data S2 stored in the storage device 12 into the model R4, and updates the state variable h (Sd6). The update processing module 442 updates the provisional models X4 and Y4, as well as the models X4' and R4 (Sd7). In Sd7, the plurality of coefficients K42 of the provisional model X4, the plurality of coefficients K41 of the provisional model Y4, the plurality of coefficients K43 of the model X4', and the plurality of coefficients K44 of the model R4 are updated so that the performance data Q1 and the estimation data Qe are brought close to each other, and so that the probability distribution λ4 (V) of the variability data V is brought close to the updated target distribution λ4' (V). The trained model M41 and the trained model M42 are generated through a repetition of the process (Sd1-Sd7) described above for a plurality of sets of the training data T1. The process Sd1-Sd6 is repeatedly executed using one musical note as the unit. The process Sd7 is repeatedly executed with respect to the errors (evaluation function F4) accumulated with respect to the training data T1.

As described above, by means of the fourth embodiment, it is possible immediately to generate the trained model M42, which can generate the variability data V, and the trained model M41, which can generate the performance data Q1 that represent various performances corresponding to the variability data V with respect to the musical score data S2 of one musical piece.

The fourth embodiment has the following advantages relative to the third embodiment. First, as can be understood from the foregoing explanation, the variability data V are sampled in accordance with the state variable h in the provisional model X4, but the musical score data S2 is not used for the generation of the variability data V. Making the variability data V independent of the musical score data S2 in this way separates the variability data from the musical context expressed by the musical score data S2, which makes it possible to present musical expressions in a more abstract manner. As a result, the variability data V take on the nature of macro information, such as the "flow" of the musical piece, rather than micro information at the level of musical notes (such as the intensity and duration, etc., of one musical note).

Next, the performance data Q1 are dependent on the variability data V and the musical score data S2, but not on the state variable h in the provisional model X4. More precisely, the performance data Q1 are indirectly dependent, via the variability data V, upon the state variable h in the provisional model X4, which is behind the variability data V. As a result, the state variable h is prevented from being directly involved in the generation of the performance data Q1, and the more general expression of the performance is encoded in the variability data V. In other words, the performance data Q1 acquire micro information from the musical score data S2, and variability data V and the state variable h in the provisional model X4 are induced to acquire macro information. The state variable h acquires transitions that the expression of the performance could undergo. The foregoing is important in the learning of musical expressions in that the variability data V become meaningful. If the performance data Q1 were directly dependent upon the state variable in a model, the presence of the variability data V would be largely ignored, and a model such as an autoregressive model of the performance data Q1 that simply uses the state variable would be trained. The reason that such a model is generated is that it is much easier for a model to learn how to simply predict the next musical note than to learn how to be able to explain the difference between musical expressions. Thus, the variability data V come to better express musical expressions, and it becomes possible to manipulate the presentation of a performance (for example, the overall intensity, articulation, and the like) in a consistent manner merely by manipulating the variability data V. In addition, because the variability data V are expressed using relatively few dimensions and the manipulation of this data is a simple matter, alterations to the musical expression become readily possible.

The trained models M41 and M42 generated in the fourth embodiment can be implemented in the estimation processing module 23 of the information processing device 100A and the estimation processing module 33 of the information processing device 100B instead of the trained model M1 of the first embodiment and the trained model M2 of the second embodiment, respectively. In this case, it becomes possible to generate the performance data Q1 that represent various performances with respect to one musical piece by means of the trained model M41 and to generate the appropriate variability data V which depend less on the musical score by means of the trained model M42.

Modified Example

Specific modifications added to each of the foregoing embodiments which serve as examples are illustrated below. Two or more embodiments arbitrarily selected from the following examples can be appropriately combined as long as they are not mutually contradictory.

(1) In the first embodiment, the variability data V are set before the generation of the performance data Q1, but the variable control module 22 can change the variability data V continuously or in a stepwise manner in parallel with the generation of the performance data Q1. That is, the variability data V, which are reflected in the time series of the unit data U of the performance data Q1 corresponding to the plurality of musical notes of the performance data Q1, change with time.

(2) In the first embodiment (FIG. 2), the pre-processing module 21 generates the musical score data S2 from the musical score data S1, but the musical score data S2 can be stored in the storage device 12, and the musical score data S2 can be input to the estimation processing module 23. In a configuration in which the musical score data S2 are stored in the storage device 12, the pre-processing module 21 is omitted. Similarly, in the second embodiment (FIG. 6), the pre-processing module 31 can be omitted by means of a configuration in which the musical score data S2 stored in the storage device 12 are input to the estimation processing module 33.

(3) In the first embodiment, the post-processing module 24 generates the performance data Q2 from the performance data Q1, but the generation of the performance data Q2 (that is, the post-processing module 24) can be omitted. In addition, in the second embodiment (FIG. 6), the pre-processing module 32 generates the performance data Q1 from the performance data Q2, but the performance data Q1 can be stored in the storage device 12 and the performance data Q1 can be input to the estimation processing module 33. In a configuration in which the performance data Q1 are stored in the storage device 12, the pre-processing module 32 is omitted.

(4) As described in each of the embodiments described above, the feature vector n10 included in the musical note data N of each note of the musical score data S2 is generated by means of a trained model, such as a convolutional neural network (CNN), or the like. A statistical estimation model (hereinafter referred to as "feature extraction model") for generating the feature vector n10 can be generated together with the trained model M1 and the trained model M2 in the process of machine learning in the third embodiment.

Figure 15:
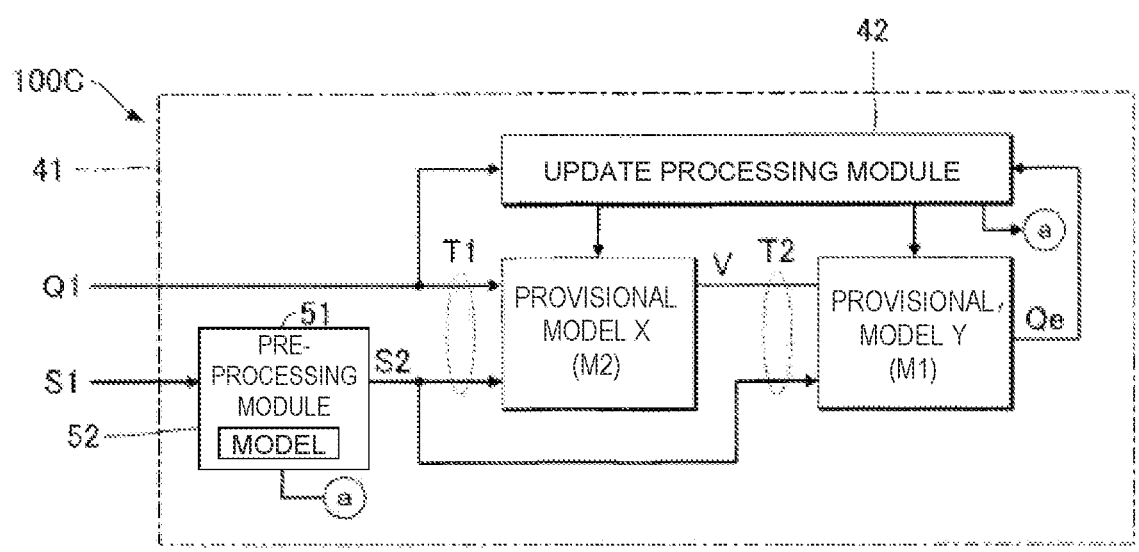
FIG. 15 is a block diagram illustrating the functional configuration of an information processing device according to a modified example of the third embodiment.

FIG. 15 is a block diagram illustrating a functional configuration of the information processing device 100C according to a modified example of the third embodiment. As shown in FIG. 15, the learning processing module 41 includes a pre-processing module 51 in addition to the same elements in the third embodiment (provisional model X, provisional model Y, and update processing module 42). The pre-processing module 51 generates the musical score data S2 from the musical score data S1 in the same manner as the pre-processing module 21 of the first embodiment and the pre-processing module 31 of the second embodiment. As shown in FIG. 15, the pre-processing module 51 is configured to include a provisional feature extraction model 52 that generates the feature vector n10 of the musical score data S2 from the musical score data S1. The feature extraction model 52 is a convolutional neural network defined by a plurality of coefficients, for example.

The update processing module 42 of FIG. 15 iteratively updates the plurality of coefficients K2 of the provisional model X, the plurality of coefficients K1 of the provisional model Y, and the plurality of coefficients of the provisional feature extraction model 52, so that the performance data Q1 and the estimation data Qe are brought close to each other, and so that the probability distribution λ (V) of the variability data V is brought close to the target distribution N (0,1). The trained feature extraction model 52 is generated as a result of the repeated updating of each coefficient. The trained feature extraction model 52 is installed in the pre-processing module 21 of the first embodiment or the pre-processing module 31 of the second embodiment and generates the feature vector n10 in the musical note data N of the musical score data S2 from the musical score data S1. By means of the configuration described above, it is possible to generate the feature extraction model 52 that can appropriately extract the feature vector n10 in the musical note data N of the musical score data S2.

Similarly, the pre-processing module 51, in which the above-described feature extraction model 52 is implemented, can also generate the musical score data S2 that are input to the provisional model Y4 of the fourth embodiment. Moreover, in this case, the provisional model X4, the provisional model Y4, and the feature extraction model 52 can be learned at the same time, in the same manner as described above.

(5) it is also possible to generate variability data V that represent a plurality of different musical expressions by means of the second embodiment and to generate variability data V that represent any musical expression by combining variability data V that represent a plurality of musical expressions. The case in which the estimation processing module 33 according to the second embodiment generates four types of variability data V1–V4 that represent different musical expressions will be used as an example. The variability data V1 and the variability data V2 represent musical expressions with different performance speeds, and the variability data V3 and the variability data V4 represent musical expressions with different performance intensities. The electronic controller 11 generates variability data Vnew by computation of Equation (2) below.

$$V_{new}=a(V1-V2)+b(V2-V4) \quad (2)$$

Symbols a and b in Equation (2) are prescribed constants. The difference (V1–V2) in the first term on the right side of Equation (2) is a musical expression corresponding to the difference between the performance speed represented by the variability data V1 and the performance speed represented by the variability data V2. The difference (V3–V4) in the second term on the right side of Equation (2), on the other hand, is a musical expression corresponding to the difference between the performance speed represented by the variability data V3 and the performance speed represented by the variability data V4. By means of the configuration described above, it is possible to generate the variability data Vnew that represent various musical expressions.

(6) The variability data V generated by the estimation processing module 33 of the second embodiment can be subjected to an interpolation process. For example, the estimation processing module 33 generates variability data Va from the musical score data S1 and performance data Q2a that represent a performance by a performer A. In addition, the estimation processing module 33 generates variability data Vb from the musical score data S1 and performance data Q2b that represent a performance by a performer B. By means of an interpolation process between the variability data Va and the variability data Vb, the electronic controller 11 generates variability data V that represent an intermediate musical expression between a musical expression peculiar to the performer A and a musical expression peculiar to the performer B.

(7) The function of the information processing device 100 (100A, 100B, 100C) according to each embodiment described above is realized by the cooperation between a computer (for example, the electronic controller 11) and a program. The program according to a preferred aspect, for example, can be stored on a computer-readable storage medium and installed on a computer. The storage medium, for example, is a non-transitory storage medium, a good example of which is an optical storage medium (optical disc) such as a CD-ROM, but can include storage media of any known format, such as a semiconductor storage medium or a magnetic storage medium. Non-transitory storage media include any storage medium that excludes transitory propagating signals and does not exclude volatile storage media. Furthermore, the program can be provided to a computer in the form of distribution via a communication network.

(8) That which executes the artificial intelligence software for realizing the trained models (M1, M2) and the feature extraction model 52 is not limited to a CPU. For example, a dedicated neural network processing circuit, such as a Tensor Processing Unit or a Neural Engine, or a dedicated artificial intelligence DSP (Digital Signal Processor) can execute the artificial intelligence software. In addition, a plurality of processing circuits selected from the examples described above can execute the artificial intelligence software in mutual cooperation.

Figure 16:
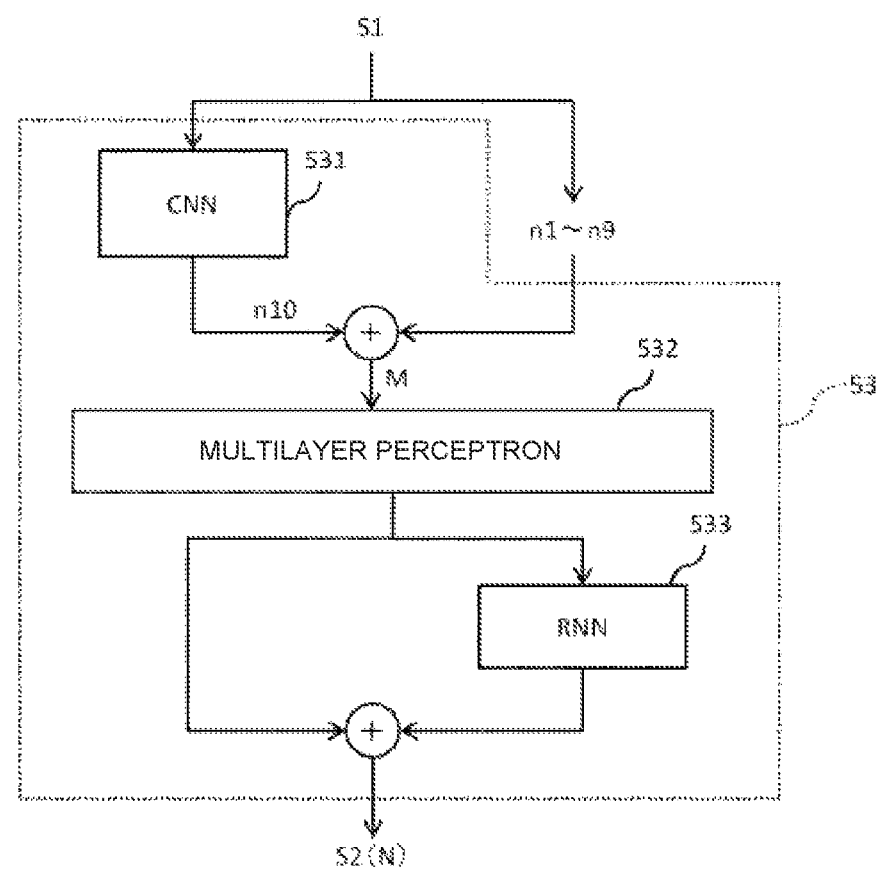
FIG. 16 is a diagram of a network model for converting musical score data by means of a pre-processing unit according to the first and second embodiments and modified examples of the third and fourth embodiments.

A statistical estimation model (hereinafter referred to as the "feature extraction model") 53 as shown in FIG. 16 can be used for the generation of the musical score data S2 by the pre-processing modules 21, 31, and 51 in the first embodiment, second embodiment, and Modified Example (4). The feature extraction model 53 is a network (CNN-RNN: Convolutional Recurrent Network) that combines a CNN and a recurrent neural network (RNN). Specifically, first, concatenated data M are generated by concatenating the above-described vectors n1-n9 and the feature vector n10, which is an output of the aforementioned CNN (indicated by reference numeral 531). The concatenated data M are sequentially generated in units of musical notes. Next, the concatenated data M are sequentially input to a multilayer perceptron 532, and the outputs of the multilayer perceptron 532 are sequentially embedded in a prescribed number of dimensions using a linear layer (not shown). The embedded vectors are sequentially input to an RNN 533 including multi-layered gated recurrent units (GRU). The GRU of each layer has the same number of neurons as the number of dimensions of the embedded vectors. Next, the sequentially acquired output of the RNN 533 and the output of the multilayer perceptron 532 are concatenated to obtain the musical note data N. Finally, the musical note data N sequentially generated in units of musical notes in this manner are concatenated to generate the musical score data S2. This generates musical score data S2 of a lower dimension which summarizes the original musical score. The use of the musical score data S2 makes it easier to recognize the melody and chords of the musical piece.

In the case that the feature extraction model 53 for generating the musical score data S2 from the musical score data S1 is applied to the Modified Example (4), the model 53 is generated together with the trained model M1 and the trained model M2 in the process of the machine learning. In this case, the pre-processing module 51 shown in FIG. 15 is configured to include the provisional feature extraction model 53 instead of the provisional feature extraction model 52 that generates the feature vector n10. In addition, also in the case that the Modified Example (4) is applied to the fourth embodiment, the feature extraction model 53 can be used instead of the feature extraction model 52.

Aspect

For example, the following configurations can be understood from the embodiments exemplified above.

An information processing method according to a preferred aspect (first aspect) comprises inputting musical score data, which represent the musical score of a musical piece, and variability data, which represent one or more factors that alter a performance of the musical piece, into a trained model in order to generate performance data which represent a performance of the musical piece that reflect the changes due to the aforementioned factors. According to the aspect described above, since the performance data are generated by inputting the musical score data and the variable variability data, it is possible to generate performance data that represent various performances corresponding to the variability data. The trained model in the first aspect is, for example, a CVAE decoder or a CVRNN decoder. For example, the above-mentioned first embodiment corresponds to a specific example of the first aspect.

In a preferred example (second aspect) of the first aspect, the musical score data include musical note data corresponding to each of various musical notes of a musical piece, and the musical note data corresponding to a first note in the musical piece include at least one or more of the time signature of the musical piece, the key signature of the musical piece, the pitch of the first note, the note value of the first note, a position of the first note within a bar, a time difference between the sound generation points of the first note and the immediately preceding note, the performance intensity of the first note, the performance symbol of the first note, the performance speed of the first note, or a feature vector that represents features of an interval of the musical piece that includes the first note. According to the aspect described above, it is possible to generate performance data that appropriately reflect one or more factors that alter the performance of the musical piece.

In a preferred example (third aspect) of the first or second aspect, the performance data include a plurality of pieces of unit data corresponding to each of different musical notes of a musical piece, and the unit data corresponding to a second note in the musical piece include at least one or more of the performance intensity of the second note, the time difference between the sound generation point specified for the second note by the musical score and the sound generation point of the second note according to the performance, the difference between the duration specified for the second note by the musical score and the duration of the second note according to the performance, or the difference between the performance speed specified for the second note by the musical score and the performance speed of the second note according to the performance. According to the aspect described above, it is possible to generate performance data that appropriately reflect one or more factors that alter the performance of the musical piece.

An information processing method according to a preferred aspect (fourth aspect) comprises inputting first training data, which include performance data that represent the performance of a musical piece, into a first provisional model in order to generate variability data, which are change variables that represent one or more factors that change the performance and that follow a specific probability distribution; inputting second training data, which include musical score data that represent a musical score of the musical piece and variability data generated by the first provisional model, into a second provisional model in order to generate estimation data that represent a performance of the musical score that reflect the changes caused by the aforementioned factors; and updating a plurality of coefficients that define the first provisional model and a plurality of coefficients that define the second provisional model, so that the performance data of the first training data and the estimation data generated by the second provisional model are brought close to each other, and so that the probability distribution of the variability data generated by the first provisional model is brought close to a specific target distribution. According to the aspect described above, it is possible to generate a trained model (first provisional model after machine learning) that can generate suitable variability data that are less dependent on the musical score, and a trained model (second provisional model after machine learning) that can generate performance data that represent various performances corresponding to the variability data. For example, the above-mentioned third embodiment and fourth embodiment correspond to specific examples of the fourth aspect.

In a preferred example (fifth aspect) of the fourth aspect, the first training data further include the musical score data. For example, the above-mentioned third embodiment corresponds to a specific example of the fifth aspect.

In a preferred example (sixth aspect) of the fourth aspect, the information processing method further comprises inputting a state variable of the first provisional model that determines the specific probability distribution into a prior distribution in order to generate a specific target distribution, wherein a coefficient that defines the prior distribution is updated together with the plurality of coefficients that define the first provisional model and the plurality of coefficients that define the second provisional model. For example, the above-mentioned fourth embodiment corresponds to a specific example of the sixth aspect.

An information processing method according to a preferred aspect (seventh aspect) comprises inputting performance data that represent a performance of a musical piece into a trained model in order to generate latent variables, which represent one or more factors that alter the performance and that follow a specific probability distribution. By means of the aspect described above, the variability data are generated by inputting the performance data into the trained model. By means of this method, it is possible to generate appropriate variability data which are less dependent on the musical score. The trained model of the seventh aspect can be, for example, a CVRNN encoder. For example, a case in which the trained model M42 of the above-described fourth embodiment is applied to the estimation processing module 33 of the second embodiment corresponds to a specific example of the seventh aspect.

An information processing method according to a preferred aspect (eighth aspect) comprises inputting musical score data, which represent the musical score of a musical piece, and performance data, which represent a performance of the musical piece, into a trained model in order to generate latent variables, which represent one or more factors that alter the performance and that follow a specific probability distribution. By means of the aspect described above, the variability data are generated by inputting the musical score data and the performance data into the trained model. Therefore, it is possible to generate, without utilizing the musical score data, suitable variability data that are less dependent on the musical score relative to a configuration in which variability data are generated by employing a trained model that was obtained by learning the relationships between the performance data and the variability data. The trained model in the eighth aspect can be, for example, a CVAE encoder. For example, the above-mentioned second embodiment corresponds to a specific example of the eighth aspect.

A preferred aspect can also be realized by an information processing device that executes the information processing method of each aspect exemplified above or by a program that causes a computer to execute the information processing method of each aspect exemplified above.

What is claimed is:

1. An information processing method realized by a computer, the information processing method comprising:
   generating performance data that represent a performance of a musical piece that reflects a change caused by a factor that alters the performance of the musical piece, by inputting musical score data, which represent a musical score of the musical piece, and variability data, which represent the factor, into a trained model that has been trained by machine leaning that uses, as input, a training musical score data, which represent a musical score of a training musical piece, and a training variability data, which represent a factor that alters a performance of the training musical piece, and, as output, estimation performance data which represent the performance of the training musical piece in accordance with the training performance data and the training variability data.

2. The information processing method according to claim 1, wherein
   the musical score data include musical note data corresponding to each of different musical notes of the musical piece, and
   the musical note data corresponding to a first note in the musical piece include at least one or more of a time signature of the musical piece, a key signature of the musical piece, a pitch of the first note, a note value of the first note, a position of the first note within a bar, a time difference between sound generation points of the first note and an immediately preceding note, a performance intensity of the first note, a performance symbol of the first note, a performance speed of the first note, or a feature vector that represents a feature of a segment of the musical piece that includes the first note.

3. The information processing method according to claim 1, wherein
   the performance data include unit data corresponding to each of different musical notes of the musical piece, and
   the unit data corresponding to a second note in the musical piece include at least one or more of a performance intensity of the second note, a time difference between a sound generation point specified for the second note by the musical score and a sound generation point of the second note according to a performance of the musical piece, a difference between a duration specified for the second note by the musical score and a duration of the second note according to the performance of the musical piece, or a difference between a performance speed specified for the second note by the musical score and a performance speed of the second note according to the performance of the musical piece.

4. The information processing method according to claim 1, further comprising
   generating the trained model, by training a provisional model by the machine leaning that uses, as the input, the training musical score data and the training variability data, and, as the output, the estimation performance data.

5. The information processing method according to claim 1, wherein
   the variability data are change variables that represent the factor and follow a specific probability distribution.

6. The information processing method according to claim 1, further comprising
   variably setting the variability data in response to an instruction of a user, the variably setting being performed by displaying an image that includes a coordinate plane, which represent the variability data, and an indication operable by the user, such that the variability data is set in accordance with a position on the coordinate plane of the indicator operated by the user.

7. The information processing method according to claim 1, wherein
   the variability data which is input into the trained mode are variable in parallel with the generating of the performance data.

8. An information processing method realized by a computer, the information processing method comprising:
   generating variability data, which are change variables that represent a factor that alters a performance of a musical piece, and which follow a specific probability distribution, by inputting first training data, which include performance data that represent the performance of the musical piece, into a first provisional model;
   generating estimation data that represent the performance of the musical piece that reflects a change caused by the factor, by inputting second training data, which include musical score data that represent a musical score of the musical piece and the variability data generated by the first provisional model, into a second provisional model; and
   updating a plurality of coefficients that define the first provisional model and a plurality of coefficients that define the second provisional model, such that the performance data of the first training data and the estimation data generated by the second provisional model approach to each other, and such that a probability distribution of the variability data generated by the first provisional model approaches a specific target distribution.

9. The information processing method realized by a computer according to claim 8, wherein
   the first training data further include the musical score data.

10. The information processing method realized by a computer according to claim 4, further comprising
    generating the specific target distribution, by inputting a state variable of the first provisional model, which determines the specific probability distribution, into a prior distribution, and
    updating a coefficient that defines the prior distribution together with the plurality of coefficients that define the first provisional model and the plurality of coefficients that define the second provisional model.

11. The information processing method according to claim 8, further comprising
    generating different performance data that is different from the performance data included in the first training data and that represent a performance of a different musical piece that reflects a change caused by a factor that alters the performance of the different musical piece, by inputting musical score data, which represent a musical score of the different musical piece, and variability data, which represent the factor, into a trained model that has been generated by repeating the generating the variability data, the generating of the estimation data, and updating of the plurality of coefficients.

12. An information processing device comprising:
an electronic controller configured to generate performance data that represent a performance of a musical piece that reflects a change caused by a factor that alters the performance of the musical piece, by inputting musical score data, which represent a musical score of the musical piece, and variability data, which represent the factor, into a trained model that has been trained by machine leaning that uses, as input, a training musical score data, which represent a musical score of a training musical piece, and a training variability data, which represent a factor that alters a performance of the training musical piece, and, as output, estimation performance data which represent the performance of the training musical piece in accordance with the training performance data and the training variability data.

13. The information processing device according to claim 12, wherein
the musical score data include musical note data corresponding to each of different musical notes of the musical piece, and
the musical note data corresponding to a first note in the musical piece include at least one or more of a time signature of the musical piece, a key signature of the musical piece, a pitch of the first note, a note value of the first note, a position of the first note within a bar, a time difference between sound generation points of the first note and an immediately preceding note, a performance intensity of the first note, a performance symbol of the first note, a performance speed of the first note, or a feature vector that represents a feature of a segment of the musical piece that includes the first note.

14. The information processing device according to claim 12, wherein
the performance data include unit data corresponding to each of different musical notes of the musical piece, and
the unit data corresponding to a second note in the musical piece include at least one or more of a performance intensity of the second note, a time difference between a sound generation point specified for the second note by the musical score and a sound generation point of the second note according to a performance of the musical piece, a difference between a duration specified for the second note by the musical score and a duration of the second note according to the performance of the musical piece, or a difference between a performance speed specified for the second note by the musical score and a performance speed of the second note according to the performance of the musical piece.

15. An information processing device comprising:
an electronic controller configured to execute
generating variability data, which are change variables that represent a factor that alters a performance of a musical piece, and which follow a specific probability distribution, by inputting first training data, which include performance data that represent the performance of the musical piece, into a first provisional model,
generating estimation data that represent the performance of the musical piece that reflects a change caused by the factor, by inputting second training data, which include musical score data that represent a musical score of the musical piece and the variability data generated by the first provisional model, into a second provisional model, and
updating a plurality of coefficients that define the first provisional model and a plurality of coefficients that define the second provisional model, such that the performance data of the first training data and the estimation data generated by the second provisional model approach to each other, and such that a probability distribution of the variability data generated by the first provisional model approaches a specific target distribution.

16. The information processing device according to claim 15, wherein
the first training data further include the musical score data.

17. The information processing device according to claim 15, further comprising
generating the specific target distribution, by inputting a state variable of the first provisional model, which determines the specific probability distribution, into a prior distribution, and
updating a coefficient that defines the prior distribution together with the plurality of coefficients that define the first provisional model and the plurality of coefficients that define the second provisional model.

* * * * *